(12) United States Patent
Schroeder et al.

(10) Patent No.: US 7,517,014 B2
(45) Date of Patent: Apr. 14, 2009

(54) PASSENGER SEAT WITH LUGGAGE COMPARTMENT

(75) Inventors: Jan Schroeder, Hamburg (DE); Werner Granzeier, Jork (DE); Andreas Wietzke, Hamburg (DE)

(73) Assignee: Airbus Deutschland GmbH (DE)

( * ) Notice: Subject to any disclaimer, the term of this patent is extended or adjusted under 35 U.S.C. 154(b) by 394 days.

(21) Appl. No.: 11/248,534

(22) Filed: Oct. 12, 2005

(65) Prior Publication Data

US 2006/0163917 A1 Jul. 27, 2006

Related U.S. Application Data

(60) Provisional application No. 60/618,623, filed on Oct. 14, 2004.

(30) Foreign Application Priority Data

Oct. 14, 2004 (DE) .................. 10 2004 050 082

(51) Int. Cl.
*A47C 7/62* (2006.01)
(52) U.S. Cl. .................. 297/188.09; 297/188.1; 244/118.1
(58) Field of Classification Search ............ 297/188.08, 297/188.09, 188.1; 244/118.1
See application file for complete search history.

(56) References Cited

U.S. PATENT DOCUMENTS 3,061,370 A * 10/1962 Murphy ................ 312/235.8 X
4,686,908 A    8/1987 Legrand
5,816,650 A   10/1998 Lucas, Jr.
5,902,009 A *  5/1999 Singh et al. ............ 297/188.1 X
6,161,896 A   12/2000 Johnson et al.
6,168,088 B1 * 1/2001 Mobley ...................... 239/6 X
6,237,994 B1   5/2001 Bentley et al.
6,249,913 B1   6/2001 Galipeau et al.
6,419,313 B1   7/2002 Newman
6,546,598 B1   4/2003 Nakanou et al.
6,588,839 B1   7/2003 Salzer
2003/0184130 A1  10/2003 Kutomi et al.
2003/0222174 A1  12/2003 Saint-Jalmes
2004/0034314 A1 * 2/2004 Kobayashi ................. 601/5 X

FOREIGN PATENT DOCUMENTS

DE    2034103 A1    1/1972
DE  202004008069 U1  9/2004
EP   0 348 130 A2   12/1989
EP   0 581 310 B1    2/1994
EP   0 980 790 A2    2/2000
EP   1 371 555 A2   12/2003

* cited by examiner

*Primary Examiner*—Anthony D Barfield
(74) *Attorney, Agent, or Firm*—Lerner, David, Littenberg, Krumholz & Mentlik, LLP

(57) ABSTRACT

A passenger seat having a substructure that comprises a hollow space. The hollow space is designed to accommodate an object such as a luggage item. Accommodating an object in the substructure makes it possible to optimize the space requirement in an aircraft.

16 Claims, 4 Drawing Sheets

PASSENGER SEAT WITH LUGGAGE COMPARTMENT

CROSS-REFERENCE TO RELATED APPLICATIONS

This application claims the benefit of the filing date of U.S. Provisional Patent Application No. 60/618,623 filed Oct. 14, 2004, the disclosure of which is hereby incorporated herein by reference.

BACKGROUND OF THE INVENTION

This invention relates to a seat. In particular, this invention relates to a passenger seat, a passenger seat group and an aircraft with a corresponding passenger seat or with a corresponding passenger seat group.

Passenger seats in means of transportation are important safeguards in dangerous situations and comfort factors for accommodating travelers. Especially in commercial aircraft, accommodating the carry on luggage of travelers is very important. On short and medium distance flights, many passengers do not want to check in their luggage so as to avoid the wait while boarding and disembarking, and prevent loss of luggage. On long-distance flights, personal articles are increasingly needed for work and entertainment, or for persona use; in addition, the traveler would very frequently also like to have a complete change of clothes at his/her disposal, since the climatic conditions at the destination most often vary. Thus, it is important that a passenger has access to her/his personal articles, also during a flight.

In order to give the passengers more free space, storage compartments were provided over the seats for carry on luggage, which can also hold outerwear. These luggage racks pose additional risks if the structural integrity of the luggage compartments should fail during a plane crash. Given the overhead position, passengers are endangered by falling luggage items or the luggage compartments themselves. In addition, falling fragments or pieces of luggage can impede or block escape routes. These risks become significantly greater still when the luggage compartments are improperly overloaded. In many parts of the world, it is all but commonplace to bring precisely the luggage items into the passenger cabin and stow them in the hat racks, e.g., those that cannot be checked in due to weight, contents, personal importance, etc.

The luggage compartments over the seat surfaces narrow the space in the roof area of the passenger cabin, further enhancing the undesired "tunnel effect" in the aircraft. In addition, it takes longer to board and disembark, since the luggage compartments can practically only be loaded and unloaded from the aisles of the passenger cabin, which are then largely blocked.

There is a demand for types of accommodation alternative to the hat racks in which passengers can stow their carry on luggage or portions thereof.

SUMMARY OF THE INVENTION

There may be a need to provide a better and safer type of accommodation.

In an exemplary embodiment of this invention as indicated in claim 1, the above object can be achieved by a passenger seat having a substructure, seat surface and seatback. The substructure has a first hollow space, wherein the first hollow space is designed to accommodate an object. For example, this hollow space can accommodate a piece of luggage. The seat surface is situated on the substructure in such a way that it can be operationally adjusted to make the first hollow space accessible. In other words, the seat surface normally covers the hollow space. However, changing the seat surface position makes it possible to uncover the hollow space to accommodate the object in the first hollow space or remove the object from the first hollow space. The seatback has a first rear side, and the substructure has a second rear side, wherein the first rear side essentially ends flush with the second rear side toward the back, or projects over the second rear side.

This may advantageously make it possible to provide a passenger seat that may not need to exhibit an essentially higher weight even with the additional function, i.e., accommodation of an object. For example, this may make it possible to accommodate pieces of luggage, in particular carry on luggage items, in the passenger seat. The seat surface may advantageously cover the first hollow space. This may make it possible to prevent objects kept in the first hollow space from bouncing around, as it were. This protection might come into play when flying through turbulence, for example.

The first hollow space may also be used as an individual passenger electronics compartment, for example. Individual electrical outlets or connections for headphones or laptops might be accommodated therein for separate passengers. A passenger seat according to this invention may retain known details, e.g., folding armrests, folding tables, luggage pockets, safety belts or entertainment systems.

Further, the first hollow space may make it possible to enlarge the seat surface, permitting it to accommodate a life jacket when flying over water. As a result, the height of the seat surface may be increased without changing the seat height for a passenger by using a portion of the first hollow space for accommodating the additional height of the seat surface.

Having the first rear side end flush or project over relative to the second rear side may give a passenger in the back more legroom.

In another exemplary embodiment of this invention as indicated in claim 2, the substructure may be designed to absorb the load of the seat surface.

This may advantageously allow just the substructure to absorb the load of the seat surface. The substructure may be designed in such a way as to be secured to seat rails usually encountered in aircraft or similar attachment means. As a result, no additional components may be required to help support the seat surface.

In another exemplary embodiment of this invention as indicated in claim 3, the first hollow space is designed to hold a norm luggage item. As a result, a compartment may advantageously be provided for a standard suitcase, e.g., a standard airline suitcase. The airline suitcase may be designed in such a way that it fits into the first hollow space. This may make it easier for a passenger to plan his/her carry on luggage.

Accommodating carry on luggage in a first hollow space in a passenger seat may advantageously lessen the amount of stowage area that must be provided for carry on luggage, e.g., hat racks. This may make it possible to reach targets, such as those specified in an IATA standard for volumes, even though not as much luggage have to be stowed over the heads of passengers. As a result, safer interior concepts may be drawn up, and accident safety levels may be increased. By potentially doing without hat racks, for example, designers may configure the passenger area with modified cell structures. This may permit the use of more effective lightweight components for the upper cabin sections of a transport means or aircraft, for example. As a result, the weight of the aircraft may be advantageously reduced.

In another exemplary embodiment of this invention as indicated in claim 4, the passenger seat has a sealing arrangement with which the first hollow space is sealable. For example, the seat surface or substructure may incorporate a lock designed to rigidly connect the seat surface with the substructure. As a result, a passenger may determine when to open or close the first hollow space. A lock for sealing the first hollow space may be opened by code or with a card (ticket card). A lock may be used to advantageously prevent unauthorized access to the first hollow space in the absence of a passenger.

In another exemplary embodiment of this invention as indicated in claim 5, the substructure is designed as a frame construction.

The frame construction may advantageously increase the stability of the substructure. This may enable a crash-proof design for the first hollow space. In other words, an object stowed in the first hollow space may be secured against detachment in the event of an accident. Further, designing the substructure as a frame construction may advantageously enable the accommodation of a fabric holder, e.g., a hangable carrier bag or soft bag. The soft containers may be carried by the frame construction. This may provide the capability of collecting waste or dirty laundry, for example.

For example, designing the substructure as a frame construction may make it possible to cut down on some of the passenger seat weight. The substructure may need not to be of a massive, solid construction, but rather may have openings in which material was removed. The supporting framework design may still offer sufficient stability.

In another exemplary embodiment of this invention as indicated in claim 6, the substructure has an upper area and a lower area. The upper area is spaced further apart from a cabin floor than the lower area. The lower area may be used for attachment to the cabin floor, e.g., by a seat rail. The substructure may taper from the upper area to the lower area.

A seat rail system in an aircraft may make it possible to adjust the gap between a first and second passenger seat in increments of 25.4 mm. The distance between seats in economy class seating in aircraft measures commonly measures 787.4 mm (31"). Given the arrangement of a first hollow space or luggage compartment under the seat surface according to the invention and taking into account the foot room, even tall individuals may sit with sufficient leg and foot room, and load and unload the first hollow space. In other words, the substructure may taper in the direction of a foot area. The foot area is here the point where the passenger seat is connected with a seat rail system.

For example, for Americans having a physical build in the $95^{th}$ percentile, it may be ergonomically possible to accommodate luggage in the hollow space and provide sufficiently comfortable seating. This may allow the airlines to retain the usual narrow distance between seats, and hence a high passenger number, in the aircraft cabin with the passenger seat according to the invention. The efficiency of tightly arranging seats in a means of transportation may thereby be retained.

In another exemplary embodiment of this invention as indicated in claim 7, the substructure is at least partially fabricated out of a transparent material.

Contents stowed in a first hollow space may advantageously be made visible from outside by at least partially manufacturing or cladding the substructure in this way, in particular if the substructure is designed as a frame construction. This may advantageously permit a visual inspection of the objects accommodated in the first hollow space of a passenger seat.

In another exemplary embodiment of this invention as indicated in claim 8, the substructure is at least partially made out of an opaque material.

At least partially manufacturing or cladding the substructure in this way, in particular if the substructure is designed as a frame construction, may prevent individuals from undesirably looking into the first hollow space. Using special materials for the cladding, such as aluminum, polycarbonate or CFK/GFK, the first hollow space may be sealed in a crash-proof manner. These materials may be able to absorb high impact forces of the kind that might be encountered during an accident, for example. As a result, an object may be prevented from being detached from a first hollow space.

In another exemplary embodiment of this invention as indicated in claim 9, the substructure is at least partially manufactured out of an open network structure.

At least partially manufacturing or cladding the substructure with an open network structure, in particular if the substructure is designed as a frame construction, may make it possible to design the first hollow space for accommodating clothing or bags, for example. As a result, an inexpensive and very light retainer may be provided in the substructure. Since dirt particles fall through the network mesh, no additional outlay may be expected for cleaning the hollow space.

In another exemplary embodiment of this invention as indicated in claim 10, the substructure can have a floor provided with at least one hole. This perforated floor may be designed as the floor of the first hollow space. This may make it easier to clean the hollow space or remove small parts from the hollow space in an advantageous fashion. Small parts that remained behind in the hollow space may be made to drop to the aircraft floor via the perforated floor or sieve-like material. The small parts may be easily removed from the floor of the aircraft, e.g., within the framework of the usual cleaning activities.

In another exemplary embodiment of this invention as indicated in claim 11, the substructure has at least one second hollow space separated from the first hollow space.

This makes it possible in an advantageous manner to provide compartments in the substructure, in which objects can be accommodated. For example, the second hollow space might have a shoe compartment to hold the shoes of a passenger to the rear. In addition, compartments might be provided for stowing periodicals or laptops, for example.

In another exemplary embodiment of this invention as indicated in claim 12, the at least one second hollow space could be accessible from a rearward position of the substructure. This may make it possible for a passenger to the rear to access the at least one second hollow space in an advantageous manner.

In another exemplary embodiment of this invention as indicated in claim 13, the first hollow space has a lighting system. The lighting system for illuminating the hollow space may simplify access to the hollow space in an advantageous manner.

In another exemplary embodiment of this invention as indicated in claim 14, the first hollow space incorporates a body massage unit. In particular during long-distance flights, this may make it possible to enhance passenger comfort in an advantageous manner. Body parts and muscles of the passenger may be massaged for providing relaxation.

In another exemplary embodiment of this invention as indicated in claim 15, the first hollow space incorporates an air-freshening unit. The air-freshening unit may make it possible to enhance the well being of passengers in an advantageous manner by releasing fragrant substances.

In another exemplary embodiment of this invention as indicated in claim 16, a leg rest is provided in the first hollow space. The leg rests may be pulled out of the hollow space in an advantageous manner into a resting or sleeping position. This may make it possible to afford a traveler more comfort during a flight. If the leg rest is not needed, it may be accommodated in the hollow space without disturbing the passenger.

In another exemplary embodiment of this invention as indicated in claim 13, the seat surface is designed in such a way that it can be used as a table surface. In the event of an unoccupied passenger seat, the seat surface of the unoccupied passenger seat may serve as a table or working surface for another passenger in an advantageous manner. It may be that the seat surface has an upholstered first upper side and a hard first lower side. A flap mechanism may make it possible to flip the seat surface, so that the first upper side becomes the second lower side, and the first lower side becomes the second upper side. The first hollow space may here advantageously accommodate the upholstered first upper side. This may enable an essentially flat second surface.

Another exemplary embodiment of this invention as indicated in claim 14 describes a passenger seat group. The passenger seat group comprises a plurality of passenger seats. As a result, carry on luggage may be accommodated in the seats in an advantageous manner, possibly eliminating the need for baggage compartments mounted over the heads of the passengers.

Another exemplary embodiment of this invention as indicated in claim 15 describes a passenger seat group that can be secured to a seat-mounting device. Mounting the passenger seat group on a seat assembly device may advantageously make it possible to avoid a complicated retrofitting on a floor structure or a seat rail. For example, standardized aircraft seat rail systems may often be used for installing passenger seats or passenger seat groups. These seat rails may enable a flexible assembly of the passenger seats or passenger seat groups.

In another exemplary embodiment of this invention as shown in the figures, the plurality of passenger seats comprises a first and second passenger seat, wherein the second passenger seat is situated in back of the first passenger seat. This may make it possible to utilize the length of the aircraft cabin in an advantageous manner when arranging the passenger seats, for example.

Another advantageously exemplary embodiment of this invention as indicated in claim 16 describes an aircraft having a passenger seat or a passenger seat group according to this invention. Such an aircraft may advantageously have a standard volume for luggage, e.g., an IATA standard volume, wherein the luggage may be accommodated in the passenger seats. For example, luggage racks over the heads of the passengers, so called hat racks, may be avoided.

Advantageous exemplary embodiments of this invention will be described below with reference to the following figures.

DETAILED DESCRIPTION

The same reference signs are used for identical or corresponding elements in the following description.

Figure 1:
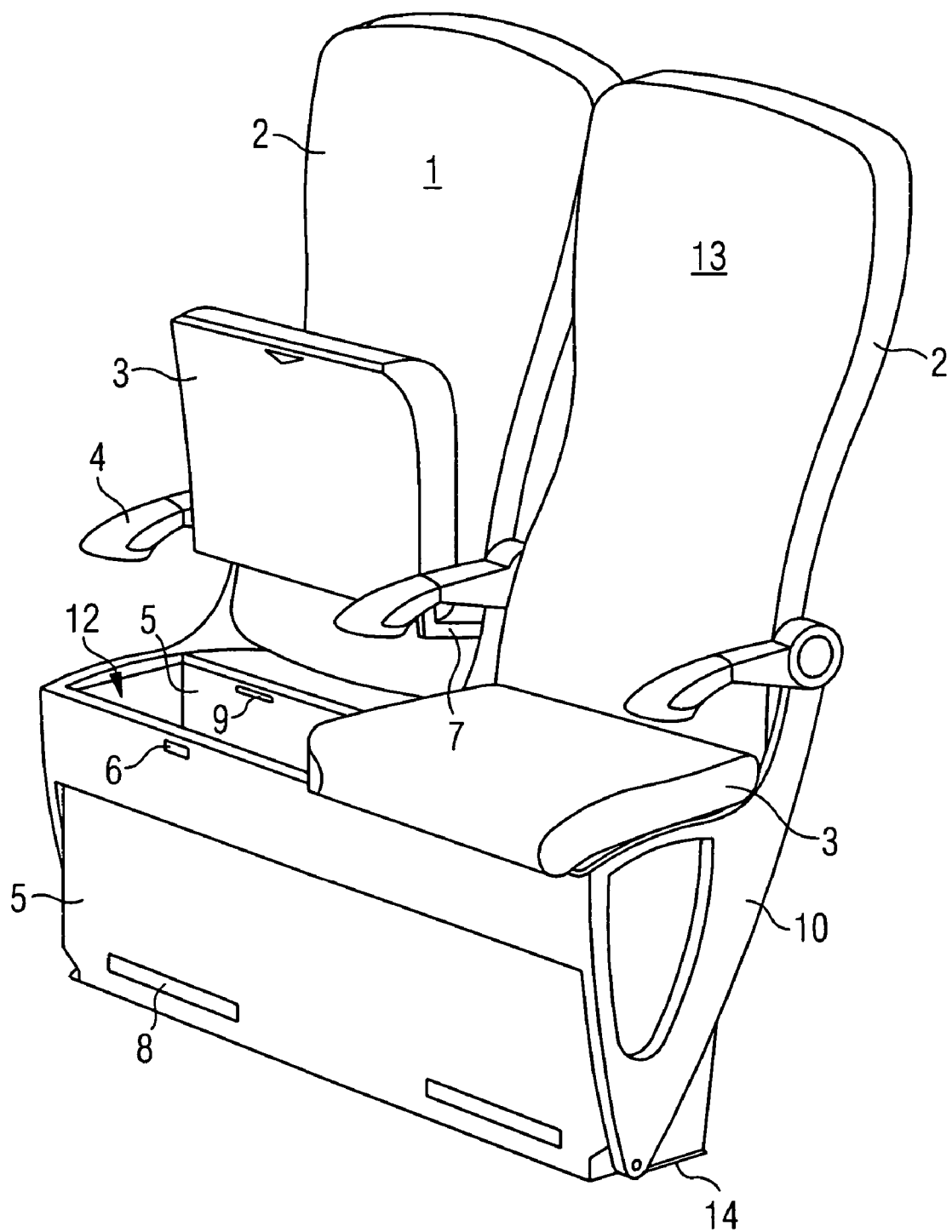
FIG. 1 shows a diagrammatic three-dimensional side view of a double seat passenger seat group according to this invention.

FIG. 1 shows a diagrammatic three-dimensional side view of a double seat passenger seat group according to this invention. The figure shows two passenger seats 1 and 13, which are arranged in a passenger seat group in a double seat configuration. The two passenger seats 1, 13 are here arranged side by side. Also conceivable in addition to the double seat configuration are a single seat (individual passenger seat) or triple seat (three individual passenger seats combined) arrangements, along with other configurations (four or more seats side by side). These arrangements can be situated one in back of the other as so-called forward configurations in a vehicle or aircraft. The passenger seat groups are here aligned and situated one in back of the other. By contrast, the seats are secured in such a way in an aft back configuration that persons in the seats are seated face-to-face or back-to-back. Other seat structures include VIP seats, which are distinguished by their size, and swivel seats, which are rotatably mounted.

Visible on FIG. 1 is a substructure 10 designed as a frame construction. The substructure 10 has a foot area 14 with which it can be secured to seat rails conventionally encountered in aircraft construction. The substructure 10 forms a hollow space 12. This hollow space 12 can perform several functions. Objects, e.g., carry on luggage, can be accommodated in the hollow space 12. The hollow space 12 can be configured in such a way as to accommodate a standard piece of luggage, e.g., an airline suitcase. Both passenger seat 1 and passenger seat 13 can have a hollow space 12. The two hollow spaces 12 can be integrated into a combined hollow space 12, or be separated by a wall into hollow spaces of varying size.

In addition to stowing luggage in the hollow space 12, the hollow space 12 can be used to accommodate other convenience components. For example, refrigerating devices 8 (e.g., a Peltier element) can be provided in the hollow space 12. Therefore, the hollow space 12 can be used to store foods and beverages, e.g., a menu box. Further, the hollow space 12 can incorporate a body massage unit, an air freshening unit or a leg support.

The substructure 10 can be covered by a cladding 5. For example, the cladding 5 can be a transparent material, e.g., acrylic glass. The transparent cladding makes it possible to see into the hollow space 12. The cladding 5 prevents the carry on luggage from falling out, and secures it during turbulence, hard landings and even crashes. Therefore, the cladding 5 fills gaps in the substructure 10 that arise given a frame or support-type design of the substructure 10. For example, the cladding 5 can be made out of opaque material, such as aluminum, polycarbonate, GFK or CFK. This prevents prying eyes from looking into the hollow space 12. In addition, the substructure 10 can have an open network structure as a cladding 5. As a result, the hollow space 12 can be used to stow laundry, for example. The cladding 5 can. take over some of the load-bearing function of the substructure 10.

The substructure 10 is used to secure seat components with a known function, such as armrests 4 or safety belts and fold up tables, for example. In addition, the seat surface 3 and seatback 2 are secured to the substructure 10. A hinged flap 7 is provided for securing the seat surface 3. This hinged flap 7 makes it possible to vary the position of the seat surface 3. As a result, the seat surface can be brought into an operating position in which the hollow space 12 is accessible. In this state, objects can be introduced into the hollow space 12 or removed from it. In a second operating position shown for passenger seat 13, the seat surface 3 lies on the substructure, simultaneously sealing off the hollow space 12. This is the normal sitting position.

A lock 6 is provided so that valuables, such as equipment, sensitive data, jewelry, etc., can be accommodated in the hollow space 12 and be protected in the absence of the passenger. The seat surface 3 can be securely connected with the substructure 10 using the lock 6. The lock can be operated by a code or card, for example. It is possible to use the passenger ticket to operate the lock.

The lighting system 9 is provided to make using the hollow space 12 easier. The lighting system 9 can provide continuous illumination, or automatically come on when opening the seat surface 3.

The lower side of the seat surface 3 can also be used for advertisements, for example. The lower side of the seat surface 3 can be viewed when changing the position of the seat surface 3. Any advertisements there become visible to the user.

Figure 2:
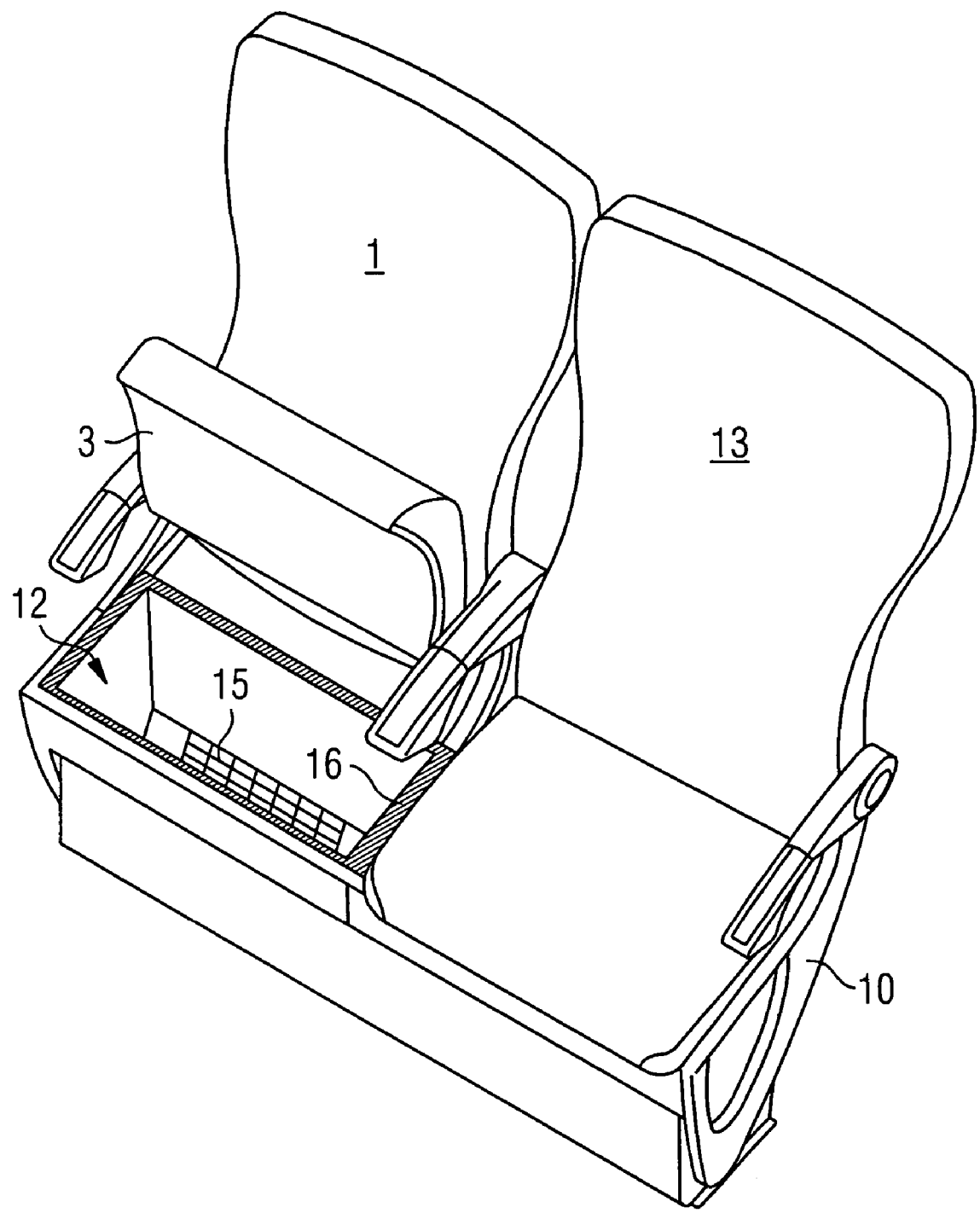
FIG. 2 shows another diagrammatic three-dimensional side view of a double seat passenger seat group according to this invention.

FIG. 2 shows another diagrammatic three-dimensional double seat passenger seat group according to this invention. FIG. 2 depicts a first passenger seat 1 and a second passenger seat 13, which are combined to form a single passenger seat group. The seats are here arranged side by side. Visible on FIG. 2 is the hollow space 12, which is separated by a wall 16 from an adjacent hollow space. As a result, the hollow space 12 can be completely sealed with the seat surface 3.

The perforated floor 15 is visible in the floor area of the hollow space 12. The perforated floor 15 makes up the floor area for the hollow space 12, and seals the hollow space 12 from below. The perforated floor 15 is connected with the substructure 10. The perforated floor 15 consists of a sieve-like structure, and encompasses at least one hole, so that small parts, e.g., contaminants, can drop through the at least one hole in the perforated floor 15 onto the aircraft floor. The small parts or contaminants can be easily removed from the aircraft floor. However, the perforated floor plate prevents larger objects from falling out. The perforated floor plate 15 also ensures a ventilation of the hollow space 12.

Figure 3:
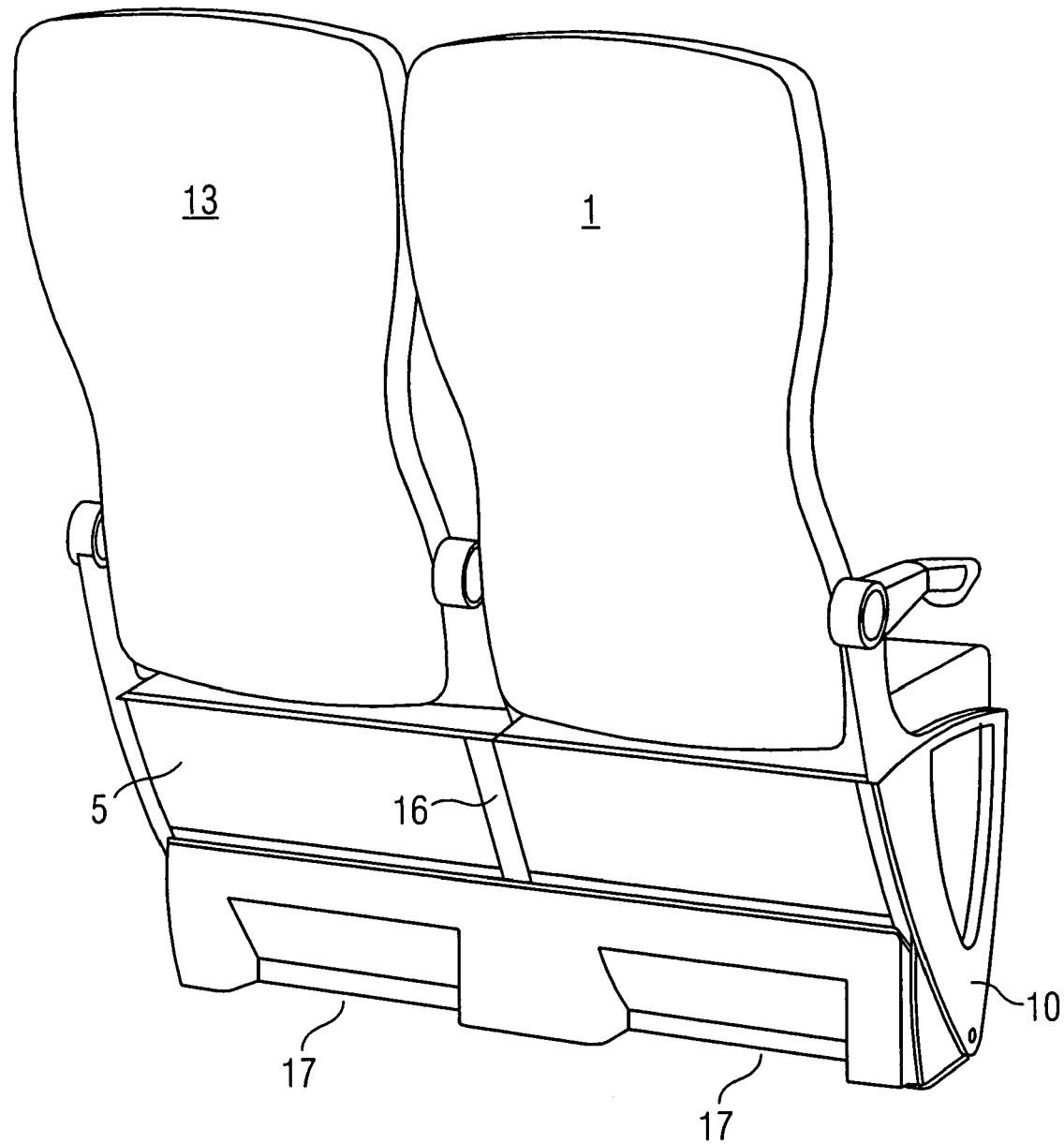
FIG. 3 shows a diagrammatic three-dimensional rear view of a double seat passenger seat group according to this invention.

FIG. 3 shows a diagrammatic three-dimensional rear view of a double seat passenger seat group according to this invention. FIG. 3 shows the passenger seat 1 and passenger seat 13 from the back in a double seat configuration. The figure shows the frame substructure 10, which forms a hollow space 12. The hollow space 12 is covered by the opaque cladding 5. The separating wall 16 separates the hollow spaces of the individual passenger seats 1, 13 from each other. The substructure 10 has recesses 17 in the rearward foot area of the double seat passenger seat group. These recesses 17 give the passenger in the back additional legroom.

Figure 4:
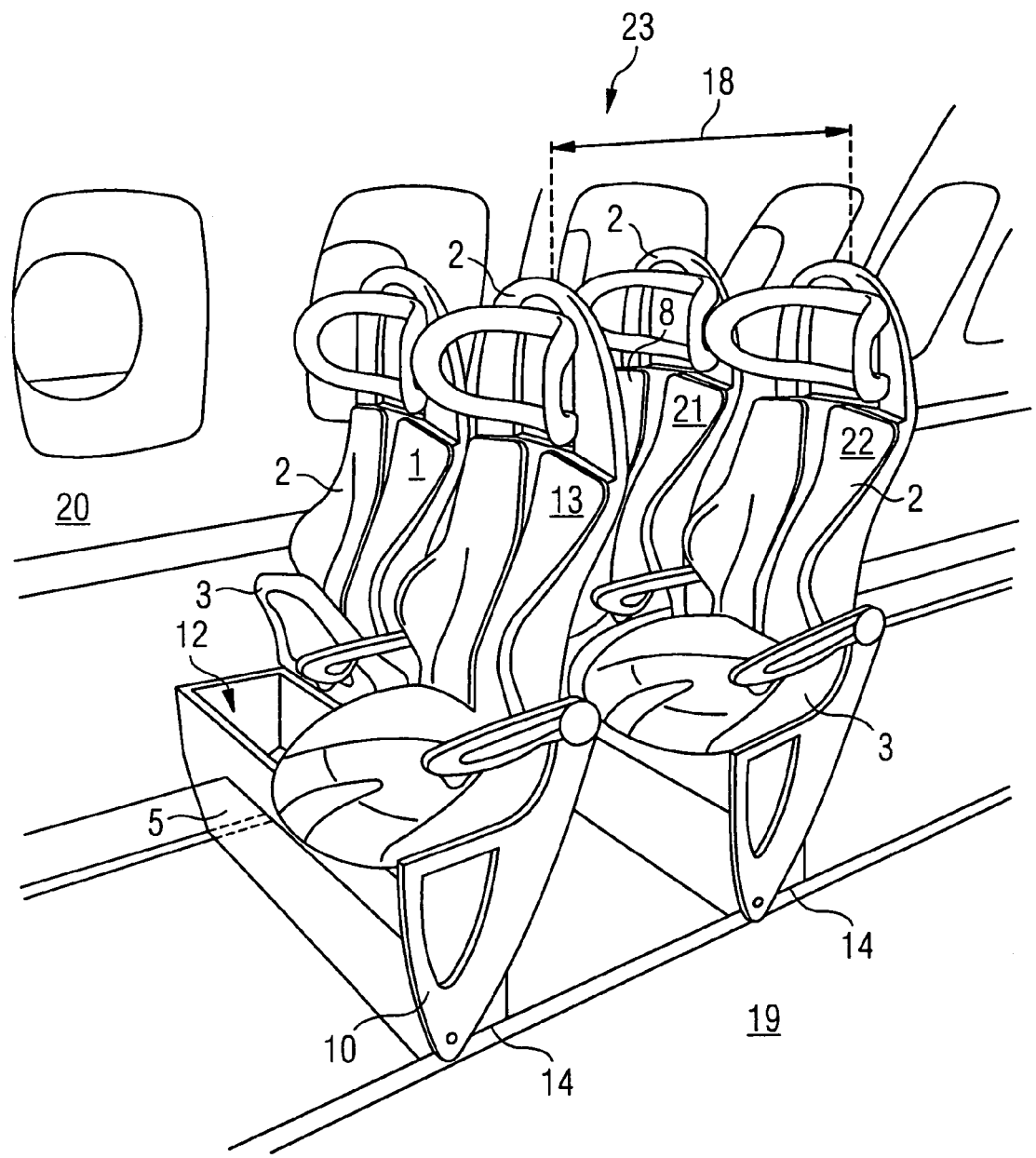
FIG. 4 shows a diagrammatic three-dimensional view of a passenger seat group of two double seat rows.

FIG. 4 shows a first double seat configuration comprising the individual passenger seats 1 and 13 and a second passenger seat group comprising the individual passenger seats 21 and 22. The configuration shows the first and second passenger seat group next to a windowed wall 20 of an aircraft. The windowed wall 20 borders the passenger seat groups on a first side, while the aisle 19 borders the passenger seat groups on a second side. The individual passenger seats 1, 13, 21 and 22 each have a hollow space 12. The hollow space 12 is protected from prying eyes by the opaque cladding 5. The seat surfaces 3 and seatbacks 2 of the individual passenger seats 1, 13, 21 and 22 are secured to the substructure 10. The seatbacks 2 of the individual passenger seats 1 and 13 are spaced apart by distance 18 from the seatbacks 2 of the individual passenger seats 21 and 22.

The distance between seats always represents a compromise between economic and ergonomic boundary conditions. In other words, economic reasons emphasize an interest in accommodating a high number of seat rows in the aircraft cabin, while ergonomic aspects make a greater distance 18 desirable for increased comfort, e.g., leg freedom. The currently accepted compromise is 787.4 mm. The seats shown on FIG. 4 ensure compliance with this distance.

Larger or smaller distances 18 are possible. To offer additional legroom for the passenger in the back, the substructure 10 tapers in the foot area 14. Taking a look at the individual passenger seat, e.g., passenger seat 13, the seatback 2 has a first rear side. The substructure 10 of the passenger seat 13 has a second rear side, wherein the first rear side abuts with the second rear side to the back. In the foot area 14, the first rear side of the seatback 2 projects over the second rear side of the substructure 10. The additional legroom also enables an easier entry into the rear seat row 21, 22 from the aisle 19. The free roof area 23 over the individual passenger seats 1, 13, 21 and 22 also facilitates entry into the passenger seats 1, 13, 21 and 22.

It must additionally be pointed out that the words "comprising" or "including" do not preclude any other elements or steps, and that the words "one" or "an" do not preclude a plurality. Further, let it be noted that any features or steps described with reference to one of the above exemplary embodiments can also be used in combination with other features or steps from other exemplary embodiments described above. Reference numbers in the claims are not to be regarded as limiting.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A passenger seat for an aircraft, comprising:
a substructure;
a seat surface;
a seatback;
wherein the substructure has a first hollow space;
wherein the first hollow space is designed to accommodate an object;
wherein the seat surface is arranged on the substructure;
wherein the seat surface can be brought into an operating position in which the hollow space is accessible;
wherein the seatback has a first rear side;
wherein the substructure has a second rear side;
wherein the first rear side essentially terminates with the second rear side to the back or projects over the second rear side;
wherein the substructure has an upper area and a lower area,
wherein the upper area is located a further distance from a cabin floor than the lower area, and
wherein the substructure tapers from the upper area to the lower area in order to offer additional legroom in the back.

2. The passenger seat according to claim 1, wherein the substructure is designed to absorb the load of the seat surface.

3. The passenger seat according to claim 1, wherein the first hollow space is designed to accommodate a normal luggage item.

4. The passenger seat according to claim 1, wherein the passenger seat comprises a locking device by which the first hollow space is sealable.

5. The passenger seat according to claim 1, wherein the substructure is designed as a frame construction.

6. The passenger seat according to claim 1, wherein the substructure is fabricated at least partially out of a transparent material.

7. The passenger seat according to claim 1, wherein the substructure is fabricated at least partially out of an opaque material.

8. The passenger seat according to claim 1, wherein the substructure is fabricated at least partially out of an open network structure.

9. The passenger seat according to claim 1, wherein the substructure comprises at least one second hollow space that is separated from the first hollow space.

10. The passenger seat according to claim 1, further comprising a lighting system for illuminating the hollow space.

11. The passenger seat according to claim 1, further comprising a body massage unit provided in the first hollow space.

12. The passenger seat according to claim 1, further comprising an air freshening unit provided in the first hollow space.

13. The passenger seat according to claim 1, wherein the seat surface is designed in such a way that it is usable as a table surface.

14. A passenger seat group for an aircraft comprising a plurality of passenger seats, each of the passenger seats comprising:
   a substructure;
   a seat surface;
   a seatback;
   wherein the substructure has a first hollow space;
   wherein the first hollow space is designed to accommodate an object;
   wherein the seat surface is arranged on the substructure;
   wherein the seat surface can be brought into an operating position in which the hollow space is accessible;
   wherein the seatback has a first rear side;
   wherein the substructure has a second rear side;
   wherein the first rear side essentially terminates with the second rear side to the back or projects over the second rear side;
   wherein the substructure has an upper area and a lower area,
   wherein the upper area is located a further distance from a cabin floor than the lower area, and
   wherein the substructure tapers from the upper area to the lower area in order to offer additional legroom in the back.

15. The passenger seat group according to claim 14, wherein the passenger seat group is mountable on a seat assembly device.

16. An aircraft comprising one or more passenger seats, each of the passenger seats comprising:
   a substructure;
   a seat surface;
   a seatback;
   wherein the substructure has a first hollow space;
   wherein the first hollow space is designed to accommodate an object;
   wherein the seat surface is arranged on the substructure;
   wherein the seat surface can be brought into an operating position in which the hollow space is accessible;
   wherein the seatback has a first rear side;
   wherein the substructure has a second rear side;
   wherein the first rear side essentially terminates with the second rear side to the back or projects over the second rear side;
   wherein the substructure has an upper area and a lower area,
   wherein the upper area is located a further distance from a cabin floor than the lower area, and
   wherein the substructure tapers from the upper area to the lower area in order to offer additional legroom in the back;
   or a passenger seat group comprising a plurality of passenger seats for an aircraft, comprising:
   a substructure;
   a seat surface;
   a seatback;
   wherein the substructure has a first hollow space;
   wherein the first hollow space is designed to accommodate an object;
   wherein the seat surface is arranged on the substructure;
   wherein the seat surface can be brought into an operating position in which the hollow space is accessible;
   wherein the seatback has a first rear side;
   wherein the substructure has a second rear side;
      wherein the first rear side essentially terminates with the second rear side to the back or projects over the second rear side;
   wherein the substructure has an upper area and a lower area,
   wherein the upper area is located a further distance from a cabin floor than the lower area, and
   wherein the substructure tapers from the upper area to the lower area in order to offer additional legroom in the back.

* * * * *